United States Patent Office 2,847,482
Patented Aug. 12, 1958

2,847,482
PROCESS FOR PRODUCING PERCHLORETHYLENE

Carlo Longiave and Federico Zanetti, Milan, Italy, assignors to Montecatini Società Generale per l'Industria Mineraria e Chimica, Milan, Italy, a corporation of Italy No Drawing. Application July 14, 1954
Serial No. 443,434

Claims priority, application Italy August 4, 1953

7 Claims. (Cl. 260—654)

The present invention relates to the preparation of perchlorethylene by reacting chlorine with aliphatic hydrocarbons, particularly methane. In order to obtain, in the chlorination of hydrocarbons, completely chlorinated products such as perchlorethylene, it is necessary to operate with a very high chlorine hydrocarbon ratio. Under such conditions, explosions may readily occur. Moreover, when operating at such high ratios and in the absence of diluents, the temperature rise in an adiabatic reactor due to the heat of reaction is very high and the thermal control of the reaction is extremely difficult.

To afford controlling the reaction conditions, it has been suggested to dilute the gaseous reaction mixture with inert gases such as nitrogen, steam, hydrogen chloride, etc. In practice, however, such procedures are rather disadvantageous from a chemical and engineering point of view, particularly because such dilutions increase the difficulties of recovering the desired product. In U. S. Patents Nos. 2,442,323 and 2,442,324 it is suggested to dilute the gaseous reaction mixture with chlorinated hydrocarbons obtained in a previous reaction and, more particularly, to employ the less desirable reaction products.

When operating according to these patents, in order to avoid explosive reactions and to enable thermal control of the reaction, the amounts of diluent which must be added are very large, and complicated distilling operations are required for separating the desired product from the diluents.

Thus, by operating with 3.5 volumes of diluent per 1 volume of methane (as disclosed in U. S. Patent No. 2,442,324), the liquid obtained after condensation contains 7 mols of diluent for 1 mol of the product.

Moreover, in the presence of amounts of diluents as indicated, the heat increase within the reaction mixture in the reactor is so great that it is very difficult to control the reaction temperature. Inasmuch as the temperature increase of the gases as a result of liberated heat of reaction is about 500–550° C., in order not to exceed an optimum reaction temperature of about 500–700° C., the mixture must be introduced into the reactor at a temperature of only about 50–150° C. which, in fact, is insufficient for starting the reaction. Consequently, the gases must continue to absorb heat from the heated reactor walls until the reaction temperature is reached. This, in turn, results in a continuous shifting of the reaction toward the reactor outlet and possibly in a premature termination of the reaction.

It is an object of this invention to produce perchlorethylene by means of an improved process which avoids the aforesaid shortcomings. To this end we recycle, by means of an injector, in the herein employed high temperature chlorination and pyrolysis of methane or other hydrocarbons, a portion of the hot gases leaving the reactor.

It is known that, for obtaining perchlorethylene at good yields upon chlorinating hydrocarbons, the operation must be carried out within rather narrow temperature limits. If the temperature is too high, considerable amounts of undesirable, highly chlorinated derivatives ($C_6Cl_6$, $C_2Cl_6$) are formed. If the temperature is too low, a large amount of carbon tetrachloride is produced which may be recycled to the reactor only after a costly separation from perchlorethylene.

The afore-mentioned recycle constitutes a simple method for obtaining a dilution of the reaction mixture which is adjustable at will and which not only eliminates the necessity of separating such extraneous products as had to be added according to prior methods, but also permits regulating at will the temperature gradient between reactor inlet and outlet, thus attaining an accurate reaction control.

The recycle capacity can be adjusted by a micrometric control of the injector nozzle. Moreover, the recycle of this invention offers the advantage that in mixing hot gases of the recycle with fresh gases entering the reactor, the fresh gases are brought up to reaction temperature. Thus, there is no necessity of a separate pre-heating step, and the disadvantages of pre-heating, resulting in an excessive thermal gradient inside of the reactor, no longer exist. Moreover, the dangers that the pre-heating temperatures are too low or that the reaction starts in the pre-heater if the preheating temperature is too high, are hereby eliminated. The latter point is particularly important in the production of $C_2Cl_4$ (as against processes for the production of chlormethanes) because of the high $Cl_2/CH_4$ ratio in the process. Carbon tetrachloride, of which small amounts are formed in the reaction in addition to perchlorethylene, can be recycled to the reactor (for example, in amounts of 1 volume $CCl_4$ for each volume of $CH_4$) if there is no interest in obtaining it as a by-product. By means of this recycle, an equilibrium is established between the amounts of $C_2Cl_4$ and $CCl_4$ produced. However, the recycling of $CCl_4$ is not for the purpose of regulating the temperature since, as said before, much larger amounts would be needed for this purpose and the produced $CCl_4$ may be entirely eliminated from recycling if it is found to be of commercial value. According to the present process, since only a moderate amount of diluent, or no diluent at all, is needed the heat supplied from the reactor is larger than the amount of heat necessary to bring the gases from room temperature to the terminal reaction temperature. Therefore, the excess heat must be removed, for example, by cooling the gases being recycled. However, it is also possible, instead of just removing the excess heat as indicated, to utilize all or part of it, provided an excess of carbon tetrachloride is available, while simultaneously converting such carbon tetrachloride to perchlorethylene which, as is well known, constitutes an endothermic reaction. For this purpose, such extraneous carbon tetrachloride is charged into the reactor together with the other gases. The conversion occurs automatically, provided the recycle gases are not cooled. Counter-balancing the resulting temperature increase in the reactor, the conversion of carbon tetrachloride contributes through its heat consumption to the stabilization of the reaction temperature. In the absence of the herein disclosed recycle of production gases, in order to avoid the danger of explosion, the gaseous reactants would have to be diluted to such an extent that, without pre-heating, not enough heat would be available for carrying out the reaction. In cases where, according to the present disclosure, heat has to be supplied to the reaction, for example in order to convert to perchlorethylene relatively large amounts of carbon tetrachloride originating from other sources, such heat requirements can be satisfied by supplying heat to the gases while recycling. This is advantageous in comparison with the supply of heat to the reactor itself, because the regular thermal course of the reaction is thereby not disturbed.

Having disclosed the principle of our new process and the advantages attainable thereby, the following examples will illustrate the manner of carrying out the invention. The examples describe the principal steps of the procedure without relating in detail to subsequent treatments of the products which comprise conventional process steps. The gas mixture leaving the reactor, with the exclusion of the recycle fraction, passes to a tower where all reaction products, except excessive chlorine, are removed by means of washing with water. The chlorine is separately recycled to the reactor, after drying with sulfuric acid, while the liquid chlorinated products separated from the aqueous solution of hydrogen chloride are recovered by conventional procedures. The volumetric terms mentioned in the examples indicate cubic meters of the respective gases, measured at 15° C. and atmospheric pressure, or equivalents thereof at different pressures and temperatures.

Example 1

During the period of one hour, 10 cu. m. methane and 35 cu. m. chlorine, both at room temperature, are passed into a reactor while, by means of an injector, about ⅘ of the gases leaving the reactor are recycled. The recycle gases are cooled in order to maintain the reactor temperature between 350° C. at the inlet and 650° C. at the outlet. As the reactor discharge, a gas mixture is obtained comprising 3 cu. m. perchlorethylene, 3.5 cu. m. carbon tetrachloride, 0.2 cu. m. hexachlorbenzene and hexachlorethane, 40 cu. m. hydrogen chloride, and 2 cu. m. chlorine.

Example 2

8 cu. m. methane, 8 cu. m. carbon tetrachloride and 26 cu. m. chlorine of a median temperature of 60° C. are charged hourly into the reactor while ¾ of the gases leaving the reactor are recycled by means of an injector nozzle, after having been sufficiently cooled to keep the reactor temperature between 420° C. at the inlet and 600° C. at the outlet. A gas mixture is discharged, comprising 3.7 cu. m. perchlorethylene, 8 cu. m. carbon tetrachloride, 0.2 cu. m. hexachlorbenzene and hexachlorethane, 32 cu. m. hydrogen chloride, and 2 cu. m. chlorine.

Example 3

8 cu. m. methane, 8 cu. m. carbon tetrachloride and 25 cu. m. chlorine of a median temperature of 60° C. are conveyed per hour to the reactor. ¾ of the gases leaving the reactor are recycled by means of the injector without subtracting heat from outside to the recycle gases or to the reactor. The reactor temperature stabilizes itself between 460° C. at the inlet and 620° C. at the outlet, and a mixture of the following composition is discharged: 4 cu. m. perchlorethylene, 7.5 cu. m. carbon tetrachloride, 0.2 cu. m. hexachlorbenzene and hexachlorethane, 32 cu. m. hydrogen chloride, and 1.4 cu. m. chlorine.

Conversion of 0.4 cu. m. carbon tetrachloride to 0.2 cu. m. perchlorethylene and 0.4 cu. m. chlorine has thus been achieved at the expense of the excess heat.

Example 4

8 cu. m. methane, 8 cu. m. carbon tetrachloride, 24 cu. m. chlorine of a median temperature of 60° C. are conveyed to the reactor during the period of one hour, while ¾ of the gases leaving the reactor are recycled by means of an injector, after heating the recycle gases in order to keep the reactor temperature between 520° C. at the inlet and 650° C. at the outlet. A mixture of the following composition is discharged: 4.5 cu. m. perchloroethylene, 6.2 cu. m. carbon tetrachloride, 0.3 cu. m. hexachlorbenzene and hexachloroethane, 32 cu. m. hydrogen chloride, and 1.7 cu. m. chlorine.

Conversion of 1.4 cu. m. carbon tetrachloride to 0.7 cu. m. perchloroethylene and 1.4 cu. m. chlorine has been achieved by means of excessive reaction heat and heat supplied while recycling.

The following example will show how it is practically impossible to operate a process for the production of perchloroethylene, while using the chlorine-methane ratios of the preceding examples in the absence of the hereindisclosed recycle of production gases.

Example 5

8 cu. m. methane, 8 cu. m. carbon tetrachloride, 25 cu. m. chlorine of a median temperature of 60° C. are conveyed to the reactor during the period of one hour, without any recycle of the gases leaving the reactor. The reaction starts only after the gases have reached the needed temperature, by absorbing heat from the reactor. As the reactor inlet is continuously cooled by the fresh gases, the reaction continuously shifts toward the outlet. Once the reaction is started there is a sudden increase of the temperature which may reach and exceed 850° C. in the hottest part of the reactor. The reaction products contain large amounts of hexachlorbenzene, while considerable amounts of carbon black are formed and the carbon tetrachloride introduced as a diluent is almost totally decomposed.

Obviously, the herein disclosed process for producing perchlorethylene is operative in conjunction with other aliphatic hydrocarbons, such as ethane, propane, ethylene, propylene, etc.

We claim:

1. In the process of producing perchlorethylene, which comprises reacting a compound of the class consisting of methane and saturated and unsaturated hydrocarbons having 2 to 3 carbon atoms with an excess of chlorine while passing through a hot enclosed zone, the improvement which consists in cooling and recycling a portion of the gaseous products leaving the enclosed zone, which portion represents between 76.6 and 81.2% by volume of the gaseous charge entering the enclosed zone, and adjusting the temperature within said enclosed zone to between 350° and 650° C.

2. In the process of producing perchlorethylene, which comprises reacting methane with an excess of chlorine while passing through a hot enclosed zone, the improvement which consists in cooling and recycling a portion of the hot gaseous products leaving the enclosed zone, which portion represents between 76.6 and 81.2% by volume of the gaseous charge entering the enclosed zone, and adjusting the temperature within said enclosed zone to between 500° and 650° C.

3. In the process of producing perchlorethylene, which comprises reacting a compound of the class consisting of methane and saturated and unsaturated hydrocarbons having 2 to 3 carbon atoms with an excess of chlorine while passing through a hot enclosed zone, the improvement which consists in recycling a portion of the hot gaseous products leaving the enclosed zone, which portion represents between 76.6 and 81.2% by volume of the gaseous charge entering the enclosed zone, after adjusting said portion to a temperature producing a reaction temperature of 500° to 650° C. within said enclosed zone.

4. In the process of producing perchlorethylene, which comprises entering, at room temperature, 1 volume of methane and from 3 to 4 volumes of chlorine into a hot enclosed zone, the improvement which consists in recycling a portion of the hot gaseous products leaving the enclosed zone, which portion represents about 78% by volume of the gaseous charge entering the enclosed zone, after cooling said portion to a temperature sufficient to maintain about 350° C. at the inlet and 650° C. at the outlet of said enclosed zone.

5. In the process of producing perchlorethylene, which comprises reacting methane with an excess of chlorine in the presence of carbon tetrachloride while passing through a hot enclosed zone, the improvement which consists in recycling a portion of the hot gaseous products leaving the enclosed zone, which portion represents between 76.6 and 81.2% by volume of the gaseous charge entering the enclosed zone, after adjusting said recycle portion to a temperature producing a reaction temperature of 550° to 650° C. within said enclosed zone.

6. In the process of producing perchlorethylene, which comprises entering 1 volume of methane, 1 volume of carbon tetrachloride and from 3 to 4 volumes of chlorine gas, each of 60° C., into a hot enclosed zone, the improvement which consists in recycling about ¾ of the hot gaseous products leaving the enclosed zone after heating said ¾ of the gaseous products to maintain about 520° C. at the inlet and about 650° C. at the outlet of said enclosed zone.

7. In the process of producing perchlorethylene, which comprises entering 1 volume of methane, 1 volume of carbon tetrachloride and from 3 to 4 volumes of chlorine gas, each of 60° C., into a hot enclosed zone, the improvement which consists in recycling about ¾ of the hot gaseous products leaving the enclosed zone after adjusting the temperature of said ¾ of the gaseous products to maintain about 400° C. at the inlet and about 600° C. at the outlet of said enclosed zone.

References Cited in the file of this patent

UNITED STATES PATENTS

| | | |
|---|---|---|
| 2,442,323 | Davis et al. | May 25, 1948 |
| 2,442,324 | Heitz et al. | May 25, 1948 |
| 2,577,388 | Warren | Dec. 4, 1951 |
| 2,658,088 | Landau et al. | Nov. 3, 1953 |
| 2,676,998 | Kuntz et al. | Apr. 27, 1954 |